Oct. 13, 1925.

H. K. KRANTZ

BOX STRUCTURE

Filed Feb. 14, 1921

1,557,066

WITNESSES:

INVENTOR
Hubert K. Krantz.
BY
ATTORNEY

Patented Oct. 13, 1925.

1,557,066

UNITED STATES PATENT OFFICE.

HUBERT K. KRANTZ, OF BROOKLYN, NEW YORK, ASSIGNOR TO WESTINGHOUSE ELECTRIC & MANUFACTURING COMPANY, A CORPORATION OF PENNSYLVANIA.

BOX STRUCTURE.

Application filed February 14, 1921. Serial No. 444,779.

*To all whom it may concern:*

Be it known that I, HUBERT K. KRANTZ, a citizen of the United States, and a resident of Brooklyn, in the county of Kings and State of New York, have invented a new and useful Improvement in Box Structures, of which the following is a specification.

My invention relates to boxes and particularly to metal boxes for enclosing electrical equipment such, for instance, as switches and fuses.

One object of my invention is to provide a box structure that may be punched from a sheet of metal in the form of a single flat sheet or blank and folded to form a box having integral bottom, side and end walls.

Another object of my invention is to provide a box structure, having the above characteristics, wherein the side and end walls are interlocked by simple, integral locking devices requiring no screws, bolts or rivets.

A further object of my invention is to provide a box structure that may be formed and assembled by simple and inexpensive stamping operations, thereby insuring rapid production and uniform size and shape.

These and other objects that will be made apparent throughout the further description of the invention are attained in the box structure herein described, and illustrated in the accompanying drawings, wherein.

Figure 1:
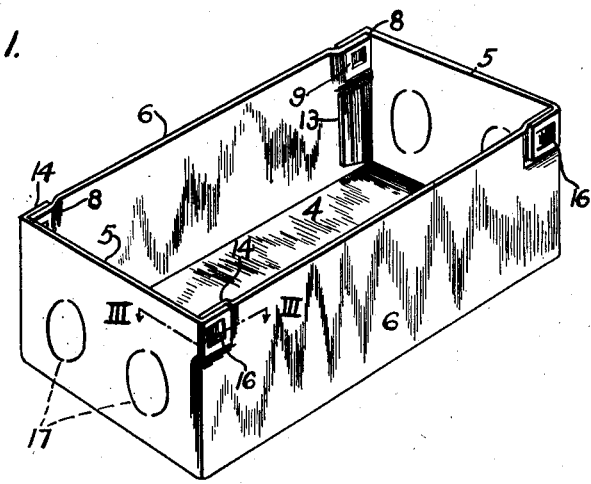
Figure 1 is a perspective view of the assembled box.
Figure 2:
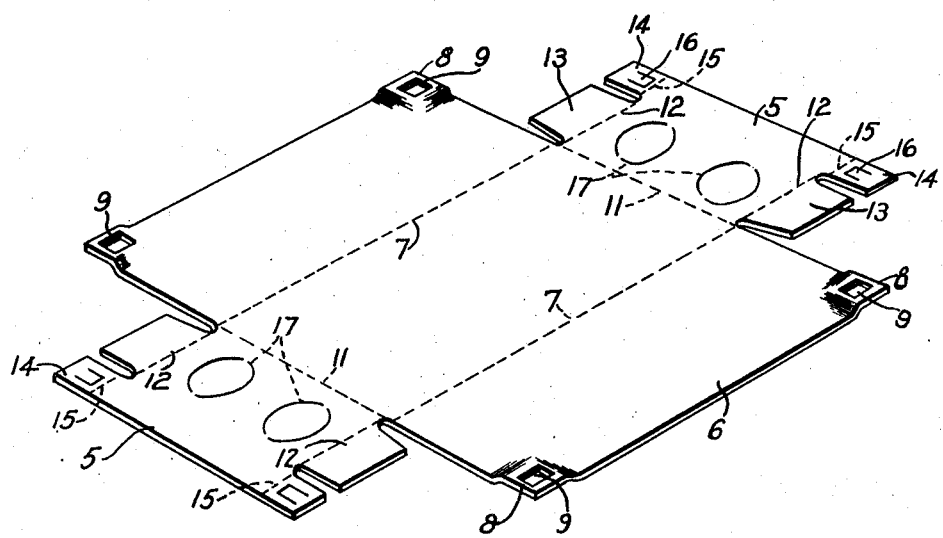
Fig. 2 is a perspective view of the blank of which the box is formed.
Figure 3:
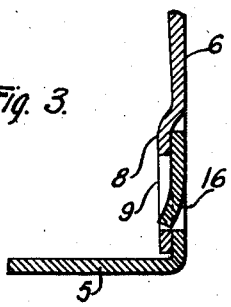
Fig. 3 is a section through the corner of the box taken on the plane III—III of Fig. 1.

Referring to the drawings, the blank of which the box is formed comprises an integral sheet-metal plate formed as illustrated in Fig. 2. The finished box comprises a bottom 4, end walls 5 and side walls 6. The side walls are formed by bending the blank, on the dotted lines 7 to a position at right angles to the bottom. The corners of the side walls are so depressed as to form offset portions 8. These portions are provided with rectangular openings 9, the purpose of which will hereinafter appear.

The end-wall members 5 are formed by bending the blank on the lines 11 to positions at right angles with the base. Before the end wall members 5 are bent, however, portions thereof are bent on the lines 12 to form flanges 13 which are located on the inner sides of the side members when the end-wall members are bent to their operative positions.

The end-wall members 5 are provided, at their outer corners, with flange members 14 that are so bent on the dotted lines 15 that they occupy positions on the exterior sides of the offset portions 8 of the side members when in assembled relation therewith.

When the end and side members are bent to their operative positions, the flanges 13 are disposed contiguous to the inner sides of the side members 6, and the flange members 14 are disposed contiguous to the outer faces of the offset portions 8. By reason of this construction, separating movement of the outer edges of the side members 6 is prevented by the engagement of the flange members 14 with the depressed portions 8.

The inward movement of the outer edges of the end members 5 is prevented by the side edges of the side members 6 which engage the portions of the end-wall members at the base of the flange members 14. Outward movement of the end-wall members is prevented by means of the tongues 16 that are upstruck from the metal of the flanges 14 and which are punched inwardly through the rectangular openings 9 in the offset portions 8 so that the free ends of the tongues 16 engage the outer walls of the rectangular openings 9.

It will be obvious that the depressed portions 8 may be provided with the tongues, and that the flanges 14 may be provided with the openings instead of the arrangement above described. By reason of the flanges 13 being disposed contiguous to the side members, ample room is provided for the usual knock outs 17 in the end members.

In the manner above described, a substantially dust-proof box is made from a single sheet of metal without the use of rivets, screws or bolts or any fastening member not integral parts of the box structure.

It will be observed that the outer faces of the flange members 14 are flush with the outer faces of the end-wall members 5. Therefore, a flanged lid or cover may be placed on the box and a substantially dust-proof connection between the cover and the box may be secured. The entire box structure may be formed by simple, inexpensive, stamping operations and the boxes will, therefore, be of uniform size and shape. Boxes that are assembled by hand-riveting operations cannot be made with equal uniformity.

While I have described and illustrated but one embodiment of my invention, it will be apparent to those skilled in the art that various changes, modifications, substitutions, additions and omissions may be made in the apparatus illustrated without departing from the spirit and scope of the invention, as set forth in the appended claims.

I claim as my invention:—

1. A box-corner interlock for two angularly disposed wall members, one of which is provided with a counter-sunk portion, comprising a divided flange on the other wall member disposed at an angle thereto, said flange having a division thereof overlapping the counter-sunk portion of the adjacent wall member and another division thereof overlapping the opposite side of the adjacent wall member.

2. A box-corner interlock for two angularly disposed wall members, one of which is provided with a counter sunk portion, comprising a divided plate member on the other wall member disposed at an angle thereto, said plate member having a division thereof overlapping the countersunk portion of the adjacent wall member and another division thereof overlapping the opposite side of the adjacent wall member, certain overlapped portions of the plate member and the adjacent wall member being interlocked by means of a tongue on one of the said portions entering a perforation in the other portion.

3. A box-corner interlock for two angularly disposed wall members comprising an angularly disposed flange portion on one wall member having a portion adapted to overlap a portion of the other member and lie interiorly of the said member, and an offset portion on the other wall member adapted to interiorly overlap another portion of the said flange, and means for preventing separation of the said members in the direction of the plane of the overlapped portions.

4. A box comprising a single sheet of material bent in the form of a box having bottom, side and end members, the end members being provided with angularly disposed flanges each having a portion interiorly overlapping a portion of the side members and preventing movement of the side members inwardly and the side members being provided with offset portions interiorly overlapping other portions of the flanges and preventing outward movement of the side members, and means interlocking the overlapped portions for preventing outward movement of the end members.

5. A box-corner interlock for two angularly disposed wall members comprising an angularly disposed flange on one wall member having a portion adapted to overlap a portion of the other member and lie interiorly of the said member and an offset portion on the other wall member adapted to interiorly overlap another portion of the said flange.

In testimony whereof, I have hereunto subscribed my name this fourth day of February, 1921.

HUBERT K. KRANTZ.